United States Patent
Li et al.

(10) Patent No.: US 10,150,685 B2
(45) Date of Patent: Dec. 11, 2018

(54) WATER RECLAMATION METHOD INTEGRATING MAGNETIC RESIN ADSORPTION AND ELECTROSORPTION

(71) Applicants: NANJING UNIVERSITY, Nanjing (CN); NANJING UNIVERSITY YANCHENG ENVIRONMENTAL PROTECTION TECHNOLOGY AND ENGINEERING RESEARCH INSTITUTE, Yancheng (CN); EST WATER AND TECHNOLOGIES CO., LTD, Changzhou (CN)

(72) Inventors: Aimin Li, Nanjing (CN); Changming Wang, Nanjing (CN); Haiou Song, Nanjing (CN); Bojun Wang, Nanjing (CN); Xiaowei Sun, Nanjing (CN); Yeli Jiang, Nanjing (CN); Zhaolian Zhu, Nanjing (CN); Xun Chen, Nanjing (CN); Jun Wang, Nanjing (CN); Zhijian Yao, Nanjing (CN); Chendong Shuang, Nanjing (CN); Haibo Li, Nanjing (CN); Yu Huang, Nanjing (CN)

(73) Assignees: NANJING UNIVERSITY (CN); NANJING UNIVERSITY YANCHENG ENVIRONMENTAL PROTECTION TECHNOLOGY AND ENGINEERING RESEARCH INSTITUTE (CN); EST WATER AND TECHNOLOGIES CO., LTD (CN)

( * ) Notice: Subject to any disclaimer, the term of this patent is extended or adjusted under 35 U.S.C. 154(b) by 83 days.

(21) Appl. No.: 15/306,773

(22) PCT Filed: Nov. 18, 2014

(86) PCT No.: PCT/CN2014/091365
§ 371 (c)(1),
(2) Date: Oct. 26, 2016

(87) PCT Pub. No.: WO2015/165251
PCT Pub. Date: Nov. 5, 2015

(65) Prior Publication Data
US 2017/0044039 A1    Feb. 16, 2017

(30) Foreign Application Priority Data
Apr. 28, 2014  (CN) .......................... 2014 1 0176164

(51) Int. Cl.
| | | |
|---|---|---|
| C02F 9/00 | (2006.01) |
| C02F 1/48 | (2006.01) |
| C02F 1/46 | (2006.01) |
| C02F 1/469 | (2006.01) |
| C02F 1/28 | (2006.01) |
| C02F 1/42 | (2006.01) |
| C02F 1/44 | (2006.01) |
| C02F 1/52 | (2006.01) |
| C02F 103/00 | (2006.01) |
| C02F 103/34 | (2006.01) |

(52) U.S. Cl.
CPC .............. *C02F 9/00* (2013.01); *C02F 1/4604* (2013.01); *C02F 1/4691* (2013.01); *C02F 1/48* (2013.01); *C02F 1/283* (2013.01); *C02F 1/285* (2013.01); *C02F 1/42* (2013.01); *C02F 1/44* (2013.01); *C02F 1/52* (2013.01); *C02F 2001/422* (2013.01); *C02F 2103/005* (2013.01); *C02F 2103/34* (2013.01); *C02F 2201/461* (2013.01); *C02F 2303/16* (2013.01)

(58) Field of Classification Search
None
See application file for complete search history.

(56) References Cited

U.S. PATENT DOCUMENTS

2008/0029395 A1 * 2/2008 Fan ...................... B01D 61/425
204/627

FOREIGN PATENT DOCUMENTS

| CN | 101905931 A | 12/2010 |
| CN | 102311201 A | 1/2012 |
| CN | 102442746 A | 5/2012 |
| CN | 103922534 A | 7/2014 |
| JP | S6097087 A | 5/1985 |

OTHER PUBLICATIONS

International Search Report; PCT/CN2014/091365; International Filing Date: Nov. 18, 2014; 2 pgs.

* cited by examiner

*Primary Examiner* — Chester T Barry
(74) *Attorney, Agent, or Firm* — Schmeiser, Olsen & Watts, LLP

(57) ABSTRACT

A water reclamation method on the basis of integrated use of magnetic resin adsorption and electrosorption is provided. It belongs to the water reclamation field, including the following steps: pump the biotreated effluent into a reactor that is filled with magnetic resin particles so that the chromaticity, organic pollutants, total nitrogen, total phosphorus contained in the wastewater can be effectively reduced; channel the fully reacted mixture into a precipitation tank for separation; part of the separated magnetic resin is pumped back into the reactor while the rest of the separated magnetic resin flows into a regeneration tank; the wastewater treated by magnetic resin adsorption then flows into an electrosorption unit for a desalting process; the remaining organic pollutants and inorganic pollutants are further removed.

8 Claims, No Drawings

WATER RECLAMATION METHOD INTEGRATING MAGNETIC RESIN ADSORPTION AND ELECTROSORPTION

CROSS-REFERENCE TO RELATED APPLICATIONS

This application claims priority to PCT Application No. PCT/CN2014/091365, having a filing date of Nov. 18, 2014, based off of Chinese Application No. 201410176164.X, having a filing date of Apr. 28, 2014, the entire contents of which are hereby incorporated by reference.

FIELD OF TECHNOLOGY

The following relates to the advanced treatment of biotreated effluent, specifically to a water reclamation method on the basis of integrated use of magnetic resin adsorption and electrosorption, more specifically to a highly effective and economically favorable water reclamation method on the basis of integrated use of magnetic resin adsorption and electrosorption that can effectively remove the remaining chromaticity, organic pollutants, total phosphorus, total nitrogen and the total salt content.

BACKGROUND

Water shortage has already become a prominent global challenge since we entered the 21st century, an age with accelerating urbanization, overpopulation and increasingly severe environmental pollution. It has become a great concern in China as well. The aggravating crisis of fresh water shortage calls for advanced technologies for treating agricultural wastewater, industrial wastewater and urban domestic sewage, particularly those that can realize deep purification of wastewater by removing most of inorganic salts, organic pollutants, total phosphorus and total nitrogen contained therein so that the high quality of reclaimed water required for multi-purpose utilization can be obtained. Development of these advanced technologies is consistent with sustainable development strategies and beneficial to communities and environmental improvement.

Biological methods are widely adopted in China to treat the agricultural wastewater, industrial wastewater and urban domestic sewage. However, with increasingly stringent standards stipulated by the Chinese government in respect of effluent discharge and reuse, it is necessary for biotreated effluent to undergo an advanced treatment process so that chromaticity, organic pollutants, total phosphorus, total nitrogen and the total salt content contained therein can be further reduced. Needless to say, efficient reuse of reclaimed water will reduce the total quantity of discharged wastewater and is consequently beneficial to the protection and conservation of water resources.

Desalting processes currently available for advanced wastewater treatment mainly include two conventional categories: the membrane process and the thermal process; the membrane desalting process mainly involves techniques such as reverse osmosis and electrodialysis; it presents excellent desalting effect, but it requires high investment and operating cost and bears a limitation that the membrane used in the process is susceptible to contamination; the thermal desalting process mainly involves techniques such as multistage flash evaporation, low-temperature multi-effect distillation, vapor compression distillation, but like the membrane desalting process, it requires high investment and operating cost as well. Another desalting process newly emerged in the field of advanced wastewater treatment is electrosorption, which realizes adsorption of ions by creating double-layer capacitance on the surface of an electrode supplied with a direct voltage less than 2 v. It is a highly effective and economically favorable process characterized by low cost and high efficiency. However, the organic pollutants in the wastewater may cause great damage to the electrosorptive electrode and therefore shorten its service life; besides, organic ions will compete with inorganic ions for adsorptive sites, which consequently lowers down the desalting efficiency of electrosorption. Therefore, when used alone for advanced wastewater treatment, electrosorption cannot guarantee the high-quality reclaimed water being obtained in an efficient and economical way.

A Chinese patent (publication number: CN 102452751A; publication date: May 16, 2012) entitled "A Method for Advanced Desalting and Reuse of Industrial Wastewater" disclosed a method for advanced desalting and reuse of industrial wastewater which is characterized in that the untreated industrial wastewater is sequentially treated in a hardness-reducing unit, a highly effective filtering unit and an electrosorptive desalting unit so that the effluent obtained therefrom can reach the reuse standards. The steps included in the process are (1). hardness reduction, precipitation and neutralization, (2). highly effective filtration; (3). electrosorptive desalting. This method requires no electrodialysis or reverse osmosis membrane devices, and it requires no ion exchange resin either. Besides, the whole system can work stably and without scale formation when the electrical conductivity of the water is higher than 2500 µS/cm. When this method is adopted to treat the biotreated effluent of industrial wastewater with electrical conductivity lower than 4500 µS/cm, the final effluent obtained therefrom can be used as water supply of an industrial recycled water system. It can be used for advanced treatment of chemical wastewater, dyeing wastewater, textile wastewater and refinery wastewater, and presents a variety of advantages such as wide applicability for various types of wastewater, stable operational performance and high desalting efficiency. However, this method is not suited to treat urban domestic sewage, particularly those types of wastewater that contains high concentration of organic pollutants, as the organic pollutants in the wastewater will cause great damage to the electrosorptive electrode and therefore shorten its service life; besides, organic ions contained therein will compete with inorganic ions for adsorptive sites, which consequently lowers down the desalting efficiency of electrosorption. Therefore, when used alone for advanced wastewater treatment, the electrosorption process disclosed in embodiments of the invention cannot guarantee the high-quality reclaimed water being obtained in an efficient and economical way. A new method need to be found for advanced treatment of wastewater with high concentration of organic pollutants, particularly a method simultaneously presenting all advantages of electrosorption and ensuring long service life of the electrode so that the high-quality reclaimed water can be obtained in an efficient and economical way.

SUMMARY

1. Technical Problem to be Solved

In view of the limitations presented in the known art, such as, firstly, the organic pollutants in the wastewater causes great damage to the electrosorptive electrode and therefore shortens its service life; secondly, organic ions contained therein compete with inorganic ions for adsorptive sites and consequently lower down the desalting efficiency of electrosorption; thirdly, when used alone for advanced wastewater treatment, the electrosorption process cannot guarantee the high-quality reclaimed water being obtained in an efficient and economical way, embodiments of the present invention provide a water reclamation method on the basis of integrated use of magnetic resin adsorption and electrosorption; this method is particularly suited to treat wastewater that contains high concentration of organic pollutants as it simultaneously presents all advantages of electrosorption and ensures long service life of the electrode; therefore, the method disclosed in embodiments of the present invention can guarantee the high-quality reclaimed water being obtained in an efficient and economical way.

2. Technical Solution

In order to solve the problems mentioned above, the technical solution adopted in embodiments of the present invention are as follows:

A water reclamation method on the basis of integrated use of magnetic resin adsorption and electrosorption, comprising the following steps:

(1) pump the biotreated effluent for further advanced treatment into an reactor that is filled with magnetic resin particles; keep the temperature at 10-60° C. and make sure the contact reaction between magnetic resin and biotreated effluent is sufficiently carried out so that the contents of organic pollutants, chromaticity, total nitrogen and total phosphorus in the original biotreated effluent are effectively reduced;

(2) channel the wastewater that has undergone sufficient mixing and reaction mentioned in step (1) into a precipitation tank for precipitation; filter away the precipitated magnetic resin from the wastewater so that the continuous operation of the whole process is guaranteed and the use efficiency of magnetic resin is improved; channel 60%-80% of the precipitated magnetic resin back into the reactor and the rest of the precipitated magnetic resin into a regeneration tank, wherein the precipitated magnetic resin is regenerated and sent back to the reactor thereafter;

(3) channel the wastewater that has undergone the filtering process mentioned in step (2) through an electrosorption unit so that the double-layer capacitance formed on the surface of the electrode of the electrosorption unit by operating voltage can be utilized (on the basis of electrostatic adsorption) to adsorb the charged ions contained in the wastewater that has been treated by magnetic resin; the concentration of inorganic salts and organic pollutants contained in the wastewater that has been treated by magnetic resin is further reduced after the electrosorption process; after the completion of the whole process of wastewater treatment, turn off the operating voltage, channel tap water into the electrosorption unit to desorb the electrode under the short circuit condition.

Preferably, the magnetic resin used in said step (1) is magnetic strong base anion exchange resin with a polyacrylic matrix, provided in one Chinese patent (application number: 201010017687.1) applied by Nanjing University.

Preferably, in said step (1), the volume ratio between the magnetic resin and the wastewater is 1:100~300.

Preferably, in said step (1), the hydraulic retention time of the wastewater within the resin reactor is 10~60 min, and the sufficient liquid-solid contact is realized through mechanical or pneumatic stirring.

Preferably, in said step (2), 5%~20% (by mass) NaCl solution is added as regeneration agent into the regeneration tank; the wastewater generated in resin desorption process is then treated with coagulation or membrane techniques.

Preferably, in said step (3), the electrode of the electrosorption unit is made from activated carbon, carbon black and polytetrafluoroethylene in the ratio of 5~16:2~3:2. The special electrode material provided in embodiments of the present invention present very strong adsorbability, which consequently enhances the general treatment capacity of the whole unit. Preferably, in said step (3), each pair of electrodes is supplied with an operating voltage of 1.5~2.0 v.

Preferably, the concentration of major quality indicators in said original biotreated effluent is: CODcr lower than 150 ppm, chromaticity lower than 100° and the total salt lower than 5000 ppm.

Magnetic resin adsorption is a well-developed process for advanced wastewater treatment, as magnetic resin can on the one hand effectively remove various organic substances and chromaticity in the biotreated effluent through adsorption, and on the other hand remove inorganic substances through ion exchange; when used for advanced wastewater treatment, it presents such advantages as high concentration ratio, low operating cost and convenient operation procedure. However, how to integrate magnetic resin adsorption with electrosorption, namely, how to overcome their respective limitations and make them work synergistically is a constant challenge to those who are skilled in the art. In embodiments of the present invention, magnetic resin is firstly utilized to reduce the quantity of organic substances in the biotreated effluent so that the damage caused by the organic pollutants to the electrosorptive electrode is reduced and the desalting efficiency is enhanced; meanwhile, the adoption of the electrosorption process can also effectively eliminate the inorganic substances generated in the magnetic resin adsorption process and remaining in the effluent thereafter; besides, in comparison with other processes for advanced wastewater treatment such as coagulation, nanofiltration and reverse osmosis, the process integrating magnetic resin adsorption and electrosorption as is disclosed in embodiments of the present invention is characterized by lower equipment investment and operating cost. Therefore, this new method has a broad application prospect. The desirable synergistic effect obtained by the method disclosed in embodiments of the present invention is unpredictable to those skilled in the art; therefore it makes substantial progress in the field of advanced wastewater treatment. Particularly, when utilized to treat the wastewater that has been previously treated by the magnetic resin prepared through the method disclosed in the Chinese patent 201010017687.1 (application number), the electrode that is made from activated carbon, carbon black and polytetrafluoroethylene in the ratio of 5~16:2~3:2 can raise the efficiency of the whole electrosorption process by more than 20%, and its service life also increases more than 2 times as its performance against contamination caused by organic or inorganic salts is greatly enhanced in comparison with those conventional eletrosorptive electrodes.

3. Beneficial Effects

In comparison with the known art, embodiments of the present invention bear the following advantages:

(1). According to the water reclamation method on the basis of integrated use of magnetic resin adsorption and electrosorption disclosed in embodiments of the present invention, the magnetic resin is firstly used to remove organic pollutants, chromaticity, total phosphorus and total nitrogen, and electrosorption is then adopted to remove the inorganic salts still contained in the wastewater; after being treated by this integrated method, the water quality is greatly improved as the mean removal rate of CODcr, chromaticity, total nitrogen, total phosphorus and the total salt content reaches 50~70%, 70~90%, 20~35%, 25~40% and above 85% respectively; the removal rate of CODcr, chromaticity and the total salt content obtained by this integrated method increases significantly in comparison with that obtained by using electrosorption alone; it has been discovered by accident that the competition for adsorptive sites between organic ions and inorganic ions, and consequently the decrease of desalting efficiency, can be effectively prevented with this integrated method, which means a synergistic effect can be obtained apart from its lower general cost and more convenient operation procedure; in short, a substantial progress has been made in this integrated method.

(2). Embodiments of the present invention can be widely used for advanced treatment of biotreated effluent of various origins, particularly those with high concentration of organic pollutants; it provides a highly effective and convenient method for production of high-quality reclaimed water.

(3). In comparison with the conventional electrosorptive electrode, the electrosorptive electrode used in embodiments of the present invention presents better regenerability and better performance against contamination caused by organic and inorganic salts due to the pretreatment effect of the magnetic resin; it therefore enjoys longer service life.

EMBODIMENTS

The present invention is illustrated in detailed with reference to the following embodiments.

Embodiment 1

The original biotreated effluent used in this embodiment comes from a large sewage treatment plant, with major quality indicators being CODcr 60-80 mg/L, chromaticity 45-60° (on the Platinum-Cobalt scale), total nitrogen 15-20 mg/L, total phosphorus 3 mg/L, the total salt content 1500 mg/L. Channel the original biotreated effluent at the flow rate of 10 m$^3$/h into an upflow pneumatically stirred reactor volume of 10 m$^3$, and simultaneously add the magnetic resin (its preparation method having been disclosed in Embodiment 1 of the Chinese patent (application number: 201010017687.1 applied by Nanjing University and its excellent effect in removing various organic pollutants, chromaticity, total phosphorus and total nitrogen having been well illustrated therein; the magnetic resin mentioned hereinafter is of the same origin) that is previously kept in a storage tank into the reactor, the ratio between added magnetic resin and wastewater being 1:300; the electrode of the electrosorption unit (the electrosorption unit itself is extensively studied and familiar to those skilled in the art) adopted in the present embodiment is made from activated carbon, carbon black and polytetrafluoroethylene in the ratio of 5:2:2; stir the magnetic resin and wastewater in the reactor at the speed of 150 r/h for 1 h and the reaction is completed; the wastewater then flows out through the outlet weir at the upper end of the reactor and into a precipitation tank, wherein the magnetic resin, due to its own magnetic aggregation process, gradually separates itself from the wastewater; the wastewater in the upper part of the precipitation tank then directly flows into the electrosorption unit and undergoes the desalting process therein under the conditions of the inflow rate 10 L/h and operating voltage 1.6 v. The mixed fluid of precipitated resin and water is channeled out from the bottom of the precipitation tank and flows at the rate of 35 L/h into a buffer tank, wherefrom 80% of the mixed fluid is pumped back into the reactor and the rest 20% flows into a regeneration tank. The deactivated magnetic resin is regenerated in the regeneration tank with 10% (by mass) NaCl solution for 30 min, and then is sent back to the resin storage tank; the deactivated regeneration agent is subjected to nanofiltration and the supernatant so obtained is used for preparation of new regeneration agent; after the completion of the whole process of wastewater treatment, turn off the operating voltage, channel 3 L tap water into the electrosorption unit to desorb the electrode under the short circuit condition. After being treated by the integrated process disclosed in embodiments of the present invention, the water quality is greatly improved as the removal rate of CODcr, chromaticity, total phosphorus, total nitrogen and total salt content reaches 70%, 90%, 31%, 39% and 90% respectively, and the service life of the electrode increases 2.1 times.

Embodiment 2

The original wastewater used in this embodiment is the biotreated effluent from a large industrial park that has undergone coagulation, precipitation and filtration, with major quality indicators being CODcr 70~110 mg/L, chromaticity 60~100° (on the Platinum-Cobalt scale), total nitrogen 15~25 mg/L, total phosphorus 2~3 mg/L, the total salt content 2000 mg/L. Channel the original biotreated effluent at the flow rate of 1 m$^3$/h into a steel mechanically stirred reactor volume of 1 m$^3$, and simultaneously add the magnetic resin (its preparation method having been disclosed in Embodiment 2 of the Chinese patent (application number: 201010017687.1 applied by Nanjing University) that is previously kept in a storage tank into the reactor, the ratio between added magnetic resin and wastewater being 1:100; stir the magnetic resin and wastewater in the reactor at the speed of 150 r/h for 1 h and the reaction is completed; the wastewater then flows out through the outlet at the upper end of the reactor and into an inclined-plate precipitation tank, wherein the magnetic resin, due to its own magnetic aggregation process, gradually separates itself from the wastewater; the wastewater in the upper part of the precipitation tank then directly flows into an electrosorption unit, the electrode of which is made from activated carbon, carbon black and polytetrafluoroethylene in the ratio of 10:3:2; the desalting process is then started under the conditions of the inflow rate 15 L/h and operating voltage 1.6 v. The mixed fluid of precipitated resin and water is channeled out from the bottom of the precipitation tank and flows at the rate of 40 L/h into a buffer tank, wherefrom 70% of the mixed fluid is pumped back into the reactor and the rest 30% flows into a regeneration tank. The deactivated magnetic resin is regenerated in the regeneration tank with 15% (by mass) NaCl solution for 35 min, and then is sent back to the resin storage tank; the desorption liquid generated therein is separately disposed of; after the completion of the whole process of wastewater treatment, turn off the operating voltage, channel 2 L tap water into the electrosorption unit to desorb the electrode under the short circuit condition. After being treated by the integrated process disclosed in embodiments of the present invention, the water quality is greatly improved as the removal rate of CODcr, chromaticity, total phosphorus, total nitrogen and the total salt content reaches 70%, 80%, 29%, 35% and 85% respectively, and the service life of the electrode increases 3 times.

Embodiment 3

The original biotreated effluent used in this embodiment comes from a paper-making park, with major quality indicators being CODcr 135 mg/L, chromaticity 75° (on the Platinum-Cobalt scale), total nitrogen 20 mg/L, total phosphorus 2 mg/L, the total salt content 1700 mg/L. Channel the original biotreated effluent at the flow rate of 0.5 m$^3$/h into a steel mechanically stirred reactor volume of 0.5 m$^3$, and simultaneously add the magnetic resin (its preparation method having been disclosed in Embodiment 3 of the Chinese patent (application number: 201010017687.1 applied by Nanjing University) that is previously kept in a storage tank into the reactor, the ratio between added magnetic resin and wastewater being 1:100; stir the magnetic resin and wastewater in the reactor at the speed of 150 r/h for 1 h and the reaction is completed; the wastewater then flows out through the outlet at the upper end of the reactor and into an precipitation tank, wherein the magnetic resin, due to its own magnetic aggregation process, gradually separates itself from the wastewater; the wastewater in the upper part of the precipitation tank then directly flows into an electrosorption unit, wherein the desalting process is started under the conditions of the inflow rate 10 L/h and operating voltage 1.8 v. The mixed fluid of precipitated resin and water is channeled out from the bottom of the precipitation tank and flows at the rate of 35 L/h into a buffer tank, wherefrom 60% of the mixed fluid is pumped back into the reactor and the rest 40% flows into a regeneration tank. The deactivated magnetic resin is regenerated in the regeneration tank with 15% (by mass) NaCl solution for 35 min, and then is sent back to the resin storage tank; the desorption liquid generated therein is separately disposed of; after the completion of the whole process of wastewater treatment, turn off the operating voltage, channel 5 L tap water into the electrosorption unit to desorb the electrode under the short circuit condition. After being treated by the integrated process disclosed in embodiments of the present invention, the water quality is greatly improved as major quality indicators are CODcr 40 mg/L, chromaticity 10°, total phosphorus 1.5 mg/L, total nitrogen 15 mg/L, the total salt content 100 mg/L respectively, and the service life of the electrode increases 2.8 times.

Embodiment 4

The original biotreated effluent used in this embodiment comes from a large chemical plant, with major quality indicators being CODcr 150 mg/L, chromaticity 80°, total nitrogen 15 mg/L, total phosphorus 3 mg/L, the total salt content 2500 mg/L. Channel the original biotreated effluent at the flow rate of 0.5 m$^3$/h into a steel mechanically stirred reactor volume of 0.5 m$^3$ and simultaneously add the magnetic resin (its preparation method having been disclosed in Embodiment 2 of the Chinese patent (application number: 201010017687.1 applied by Nanjing University) that is previously kept in a storage tank into the reactor, the ratio between added magnetic resin and wastewater being 1:200; stir the magnetic resin and wastewater in the reactor at the speed of 180 r/h for 1 h and the reaction is completed; the wastewater then flows out through the outlet at the upper end of the reactor and into an precipitation tank, wherein the magnetic resin, due to its own magnetic aggregation process, gradually separates itself from the wastewater; the waste- water in the upper part of the precipitation tank then directly flows into an electrosorption unit, wherein the desalting process is started under the conditions of the inflow rate 10 L/h and operating voltage 1.5 v. The mixed fluid of precipitated resin and water is channeled out from the bottom of the precipitation tank and flows at the rate of 40 L/h into a buffer tank, wherefrom 70% of the mixed fluid is pumped back into the reactor and the rest 30% flows into a regeneration tank. The deactivated magnetic resin is regenerated in the regeneration tank with 15% (by mass) NaCl solution for 30 min, and then is sent back to the resin storage tank; the desorption liquid generated therein is separately disposed of and reused thereafter. After being treated by the integrated process disclosed in embodiments of the present invention, the water quality is greatly improved as major quality indicators are CODcr 45 mg/L, chromaticity 20°, total phosphorus 2 mg/L, total nitrogen 13 mg/L, the total salt content 150 mg/L respectively.

Embodiment 5

The original biotreated effluent used in this embodiment comes from a sewage treatment plant (daily processing capacity: 100,000 tons), with major quality indicators being CODcr 40~60 mg/L, chromaticity 30~50° (on the Platinum-Cobalt scale), total nitrogen 18 mg/L, total phosphorus 2 mg/L, the total salt content 800 mg/L. Channel the original biotreated effluent at the flow rate of 15 m$^3$/h into an upflow pneumatically stirred reactor volume of 10 m$^3$ and simultaneously add the magnetic resin (its preparation method having been disclosed in Embodiment 2 of the Chinese patent (application number: 201010017687.1 applied by Nanjing University) that is previously kept in a storage tank into the reactor, the ratio between added magnetic resin and wastewater being 1:300; stir the magnetic resin and wastewater in the reactor at the speed of 160 r/h for 1 h and the reaction is completed; the wastewater then flows out through the outlet weir at the upper end of the reactor and into a precipitation tank, where the magnetic resin, due to its own magnetic aggregation process, gradually separates itself from the wastewater; the wastewater in the upper part of the precipitation tank then directly flows into an electrosorption unit, wherein the desalting process is started under the conditions of the inflow rate 15 L/h and operating voltage 1.6 v. The mixed fluid of precipitated resin and water is channeled out from the bottom of the precipitation tank and flows at the rate of 45 L/h into a buffer tank, wherefrom 80% of the mixed fluid is pumped back into the reactor and the rest 20% flows into a regeneration tank. The deactivated magnetic resin is regenerated in the regeneration tank with 10% (by mass) NaCl solution for 30 min, and then is sent back to the resin storage tank; the desorption liquid generated therein is separately disposed of After being treated by the integrated process disclosed in embodiments of the present invention, the water quality is greatly improved as major quality indicators are CODcr 20 mg/L, chromaticity 10°, total phosphorus 1.4 mg/L, total nitrogen 15 mg/L, the total salt content 50 mg/L respectively.

Embodiment 6

The original biotreated effluent used in this embodiment comes from a large dyeing factory, with major quality indicators being CODcr 100~150 mg/L, chromaticity 80°, total nitrogen 20 mg/L, total phosphorus 2 mg/L, the total salt content 3000 mg/L. Channel the original biotreated effluent at the flow rate of 10 m$^3$/h into an upflow pneumatically stirred reactor volume of 10 m³ and simultaneously add the magnetic resin (its preparation method having been disclosed in Embodiment 4 of the Chinese patent (application number: 201010017687.1 applied by Nanjing University) that is previously kept in a storage tank into the reactor, the ratio between added magnetic resin and wastewater being 1:100; stir the magnetic resin and wastewater in the reactor at the speed of 180 r/h for 1 h and the reaction is completed; the wastewater then flows out through the outlet weir at the upper end of the reactor and into a precipitation tank, wherein the magnetic resin, due to its own magnetic aggregation process, gradually separates itself from the wastewater; the wastewater in the upper part of the precipitation tank then directly flows into an electrosorption unit, wherein the desalting process is started under the conditions of the inflow rate 10 L/h and operating voltage 2.0 v. The mixed fluid of precipitated resin and water is channeled out from the bottom of the precipitation tank and flows at the rate of 40 L/h into a buffer tank, wherefrom 70% of the mixed fluid is pumped back into the reactor and the rest 30% flows into a regeneration tank. The deactivated magnetic resin is regenerated in the regeneration tank with 15% (by mass) NaCl solution for 30 min, and then is sent back to the resin storage tank; the desorption liquid generated therein is separately disposed of. After being treated by the integrated process disclosed in embodiments of the present invention, the water quality is greatly improved as major quality indicators are CODcr 40 mg/L, chromaticity 20°, total phosphorus 1.5 mg/L, total nitrogen 16 mg/L, the total salt content 80 mg/L respectively.

Embodiment 7

The original biotreated effluent used in this embodiment comes from a sewage treatment plant (daily processing capacity: 1200,000 tons), with major quality indicators being CODcr 20~40 mg/L, chromaticity 40° (on the Platinum-Cobalt scale), total nitrogen 23 mg/L, total phosphorus 1.8 mg/L, the total salt content 600 mg/L. Channel the original biotreated effluent at the flow rate of 0.5 m³/h into a steel mechanically stirred reactor volume of 0.5 m³, and simultaneously add the magnetic resin (its preparation method having been disclosed in Embodiment 5 of the Chinese patent (application number: 201010017687.1 applied by Nanjing University) that is previously kept in a storage tank into the reactor, the ratio between added magnetic resin and wastewater being 1:300; stir the magnetic resin and wastewater in the reactor at the speed of 150 r/h for 1 h and the reaction is completed; the wastewater then flows out through the outlet weir at the upper end of the reactor and into a precipitation tank, wherein the magnetic resin, due to its own magnetic aggregation process, gradually separates itself from the wastewater; the wastewater in the upper part of the precipitation tank then directly flows into an electrosorption unit, wherein the desalting process is started under the conditions of the inflow rate 15 L/h and operating voltage 1.6 v. The mixed fluid of precipitated resin and water is channeled out from the bottom of the precipitation tank and flows at the rate of 45 L/h into a buffer tank, wherefrom 80% of the mixed fluid is pumped back into the reactor and the rest 20% flows into a regeneration tank. The deactivated magnetic resin is regenerated in the regeneration tank with 10% (by mass) NaCl solution for 30 min, and then is sent back to the resin storage tank; the desorption liquid generated therein is separately disposed of After being treated by the integrated process disclosed in embodiments of the present invention, the water quality is greatly improved as major quality indicators are CODcr 10 mg/L, chromaticity 10°, total phosphorus 1.4 mg/L, total nitrogen 16 mg/L, the total salt content 50 mg/L respectively.

Embodiment 8

The original biotreated effluent used in this embodiment comes from a sewage treatment plant (daily processing capacity: 50,000 tons), with major quality indicators being CODcr 80~90 mg/L, chromaticity 40~60° (on the Platinum-Cobalt scale), total nitrogen 20 mg/L, total phosphorus 2 mg/L, the total salt content 1000 mg/L. Channel the original biotreated effluent at the flow rate of 15 m³/h into an upflow pneumatically stirred reactor volume of 10 m³ and simultaneously add the MIEX® magnetic resin (manufactured by Orica Australia Pty, Ltd. and commercially available; U.S. Pat. No. 7,291,272 B2) that is previously kept in a storage tank into the reactor, the ratio between added magnetic resin and wastewater being 1:200; stir the magnetic resin and wastewater in the reactor at the speed of 180 r/h for 1 h and the reaction is completed; the wastewater then flows out through the outlet weir at the upper end of the reactor and into an precipitation tank, wherein the magnetic resin, due to its own magnetic aggregation process, gradually separates itself from the wastewater; the wastewater in the upper part of the precipitation tank then directly flows into an electrosorption unit, wherein the desalting process is started under the conditions of the inflow rate 15 L/h and operating voltage 1.7 v. The mixed fluid of precipitated resin and water is channeled out from the bottom of the precipitation tank and flows at the rate of 40 L/h into a buffer tank, wherefrom 80% of the mixed fluid is pumped back into the reactor and the rest 20% flows into a regeneration tank. The deactivated magnetic resin is regenerated in the regeneration tank with 15% (by mass) NaCl solution for 30 min, and then is sent back to the resin storage tank; the desorption liquid generated therein is separately disposed of. After the wastewater being treated by the integrated process disclosed in embodiments of the present invention, the major quality indicators are CODcr 25 mg/L, chromaticity 10°, total phosphorus 18 mg/L, total nitrogen 1.5 mg/L, the total salt content 80 mg/L respectively.

The invention claimed is:
1. A water reclamation method based on integrated use of magnetic resin adsorption and electrosorption, comprising the following steps:
   (1) pumping a biotreated effluent for further advanced treatment into a reactor that is filled with magnetic resin particles; maintaining a temperature at 10~60° C. and making sure the contact reaction between the magnetic resin and the biotreated effluent is carried out;
   (2) channelling a wastewater that has undergone sufficient mixing and reaction with the magnetic resin in the reactor into a precipitation tank for precipitation; separating the precipitated magnetic resin from the wastewater through filtration; pumping 60%~80% of the precipitated magnetic resin back into the reactor and a remainder portion of the precipitated magnetic resin is regenerated into a regeneration tank, wherein the precipitated magnetic resin is regenerated and then sent back to the reactor for reuse;
   (3) channelling the wastewater that has undergone the filtration mentioned in step (2) into an electrosorption unit so that a double-layer capacitance generated on a surface of an electrosorptive electrode by operating voltage can be utilized on a basis of electrostatic adsorption to adsorb charged ions contained in the wastewater that has been treated by magnetic resin and undergone the filtration mentioned in step (2); after completion of the whole process of wastewater treatment, turning off the operating voltage, channeling 2-5 L tap water into the electrosorption unit to desorb the electrode under a short circuit condition.

2. The water reclamation method based on integrated use of magnetic resin adsorption and electrosorption as defined in claim 1, wherein the magnetic resin used in said step (1) is magnetic strong base anion exchange resin with a polyacrylic matrix.

3. The water reclamation method based on integrated use of magnetic resin adsorption and electrosorption as defined in said claim 1, wherein in step (1) the volume ratio between said magnetic resin and the wastewater is 1:100~300.

4. The water reclamation method based on integrated use of magnetic resin adsorption and electrosorption as defined in claim 1, wherein in said step (1) a hydraulic retention time of the wastewater within the resin reactor is 10~60 min, and a liquid-solid contact is realized through mechanical or pneumatic stirring.

5. The water reclamation method based on integrated use of magnetic resin adsorption and electrosorption as defined in claim 1, wherein in said step (2), 5%~20% by mass NaCl solution is added as regeneration agent into the regeneration tank, and the wastewater generated in a resin desorption process is then treated with coagulation or membrane techniques.

6. The water reclamation method based on integrated use of magnetic resin adsorption and electrosorption as defined in claim 1, wherein in said step (3) the electrode of the electrosorption unit is made from activated carbon, carbon black and polytetrafluoroethylene in the ratio of 5-16:2-3:2.

7. The water reclamation method based on integrated use of magnetic resin adsorption and electrosorption as defined in claim 6, wherein in said step (3) the electrode is supplied with an operating voltage of 1.5~2.0 v.

8. The water reclamation method based on integrated use of magnetic resin adsorption and electrosorption as defined in claim 5, wherein a concentration of major quality indicators in the original biotreated effluent is: a critical chemical oxygen demand (CODcr) lower than 150 ppm, a chromaticity lower than 100°, and a total salt lower than 5000 ppm.

* * * * *